Nov. 20, 1945.    W. SIEGERIST    2,389,556
TURNING MACHINE
Filed July 27, 1942    6 Sheets-Sheet 1

INVENTOR:
W. Siegerist
by Carr & Carr Gravely
HIS ATTORNEYS.

Nov. 20, 1945.   W. SIEGERIST   2,389,556
TURNING MACHINE
Filed July 27, 1942   6 Sheets-Sheet 4

INVENTOR:
Walter Siegerist
by Carr, Carr & Gravely
HIS ATTORNEYS.

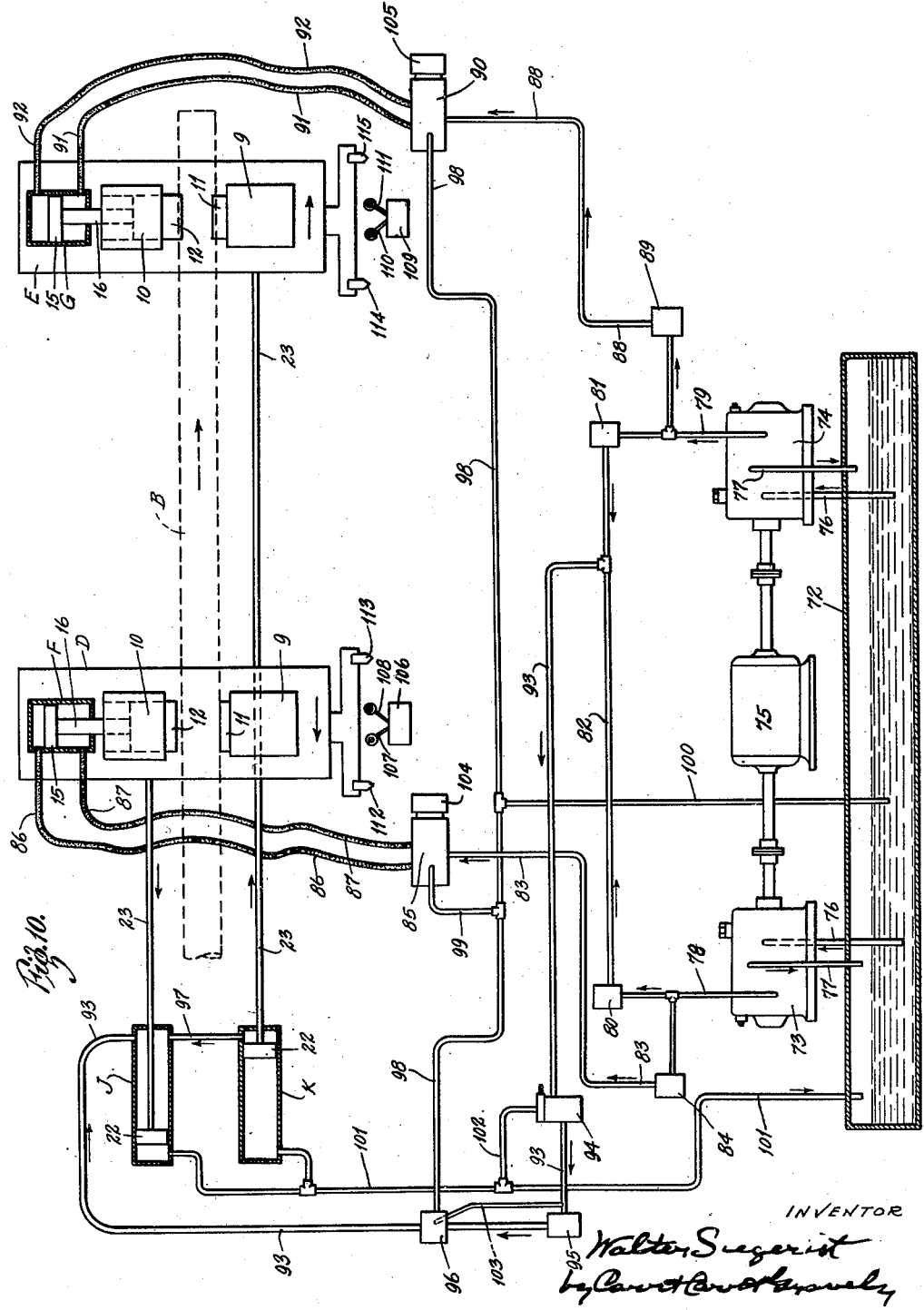

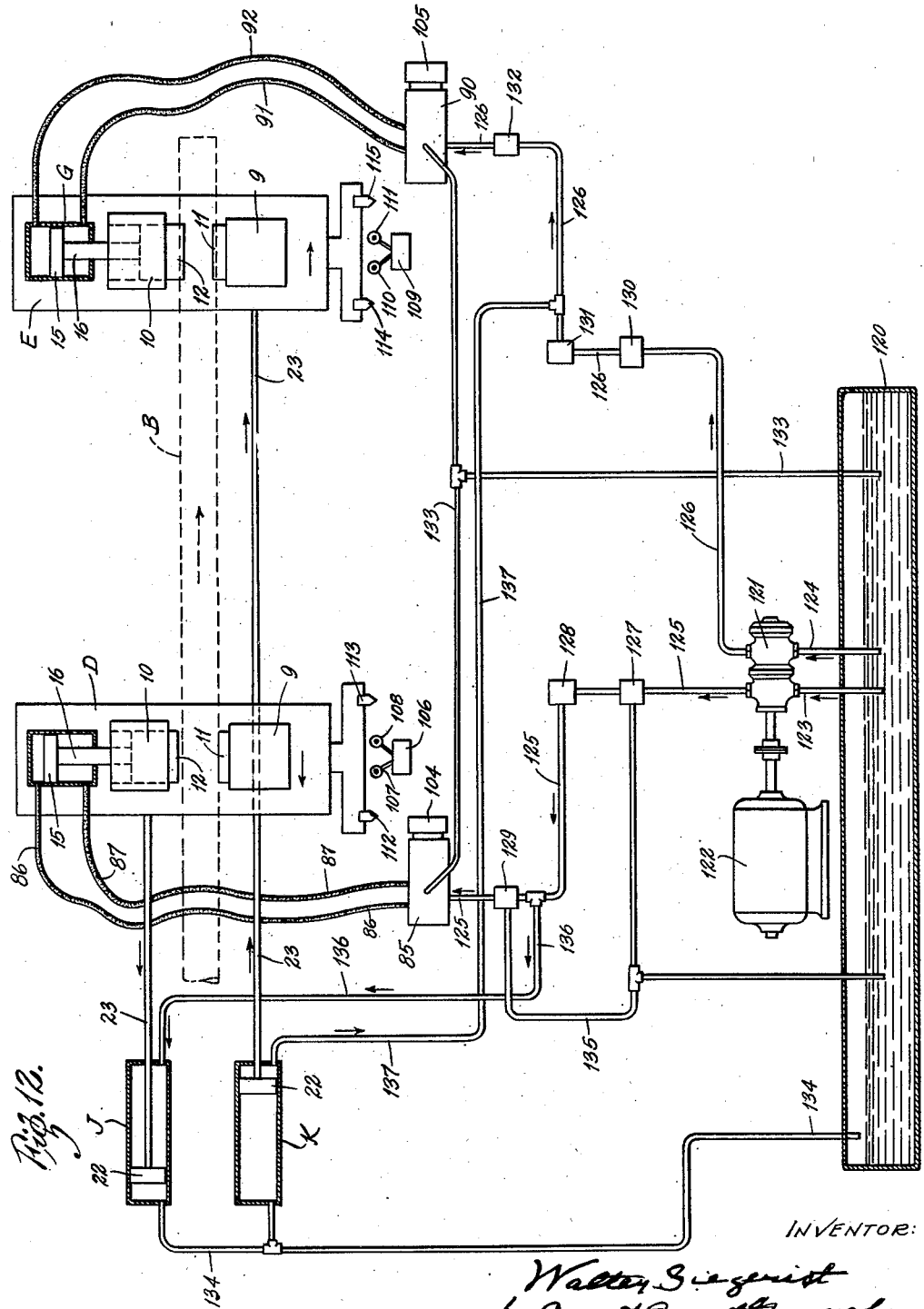

Patented Nov. 20, 1945

2,389,556

UNITED STATES PATENT OFFICE 2,389,556

TURNING MACHINE

Walter Siegerist, University City, Mo.

Application July 27, 1942, Serial No. 452,476

22 Claims. (Cl. 82—20)

This invention relates generally to machines for turning and finishing long bar stock of circular section, and more particularly to the mechanism for feeding the bar stock axially through the rotary cutterheads of the machine while holding said stock against rotation. The principal object of the present invention is to provide a multiple carriage feed mechanism for smoothly, accurately and continuously feeding the bar stock through the rotary cutter head of a turning machine of the above type. Another object is to provide for overlapping the feed movement of the respective carriages and thus obtain a continuous feed of the stock. Other objects are to provide for mechanically moving the carriages in feeding direction at the same rate of feed, to provide for hydraulically returning each carriage to starting position during the mechanical feed movement of the other carriage, to provide for hydraulically opening and closing the bar gripping elements of the carriages, and to utilize the mechanical carriage feed for regulating the rate at which the carriages return to starting position under hydraulic influence. Another object is to utilize the return movement of the carriages for withdrawing the bar from the cutterhead before it is completely turned and has passed through said cutterhead. Another object of the invention is to provide an electric control circuit for the hydraulic circuit which controls the stock gripping or clamping elements of the carriages and the return movement thereof.

The invention consists in the combined mechanical and hydraulic carriage feed; it also consists in the hydraulically actuated means for clamping the stock to the carriages, it also consists in the electric control for said hydraulic stock clamping and carriage actuating means, and it also consists in the parts and in the arrangements and combinations of parts hereinafter described and claimed.

Figure 1:
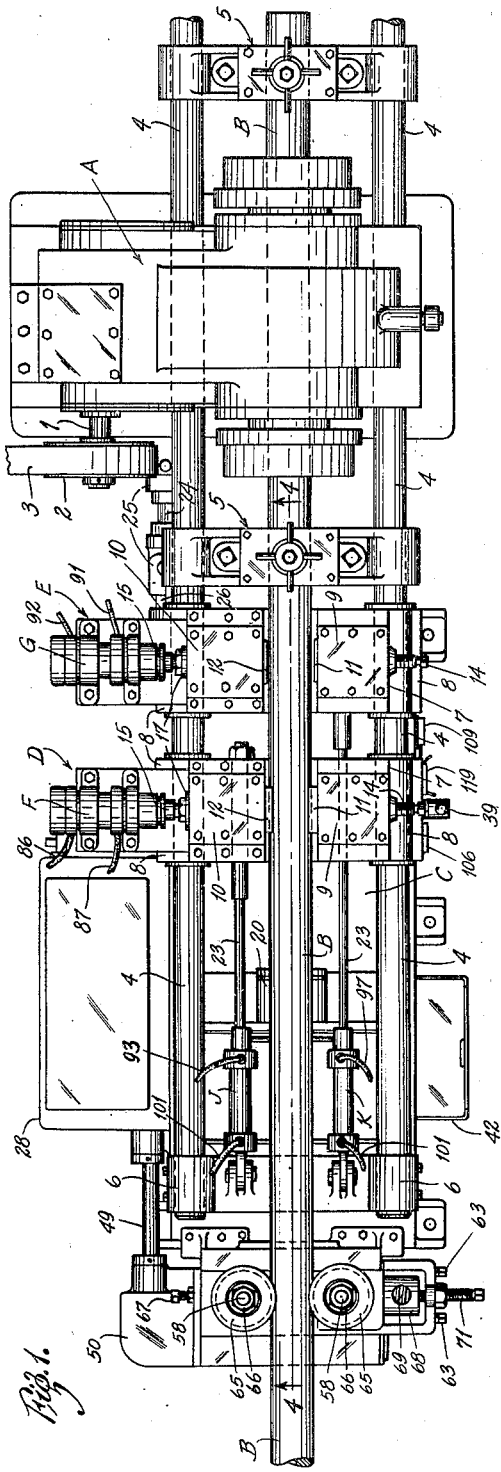
Figure 2:
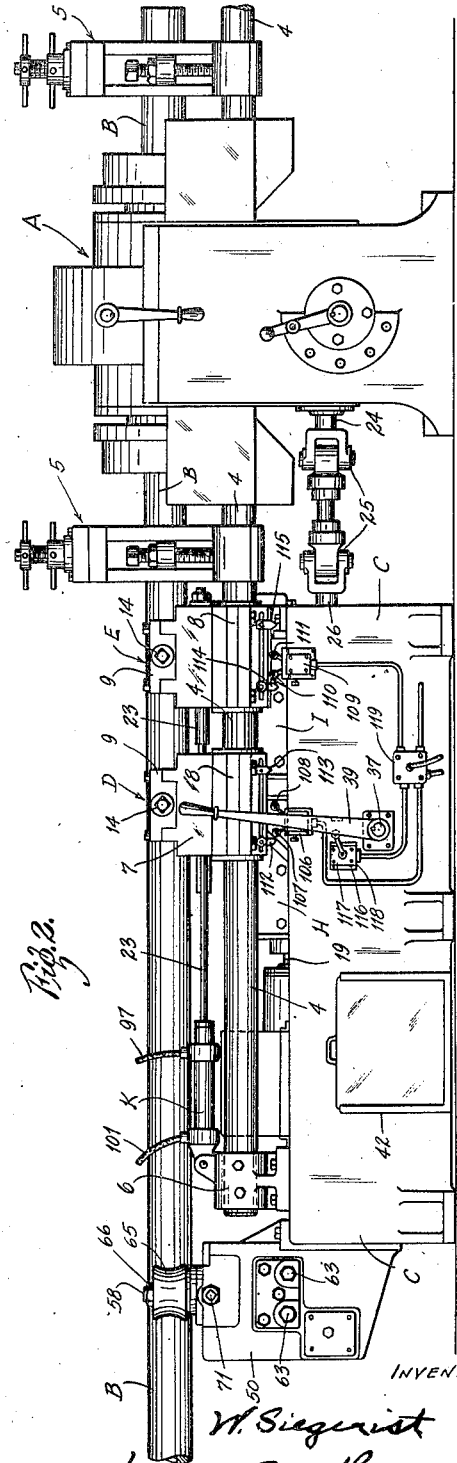
Figure 3:
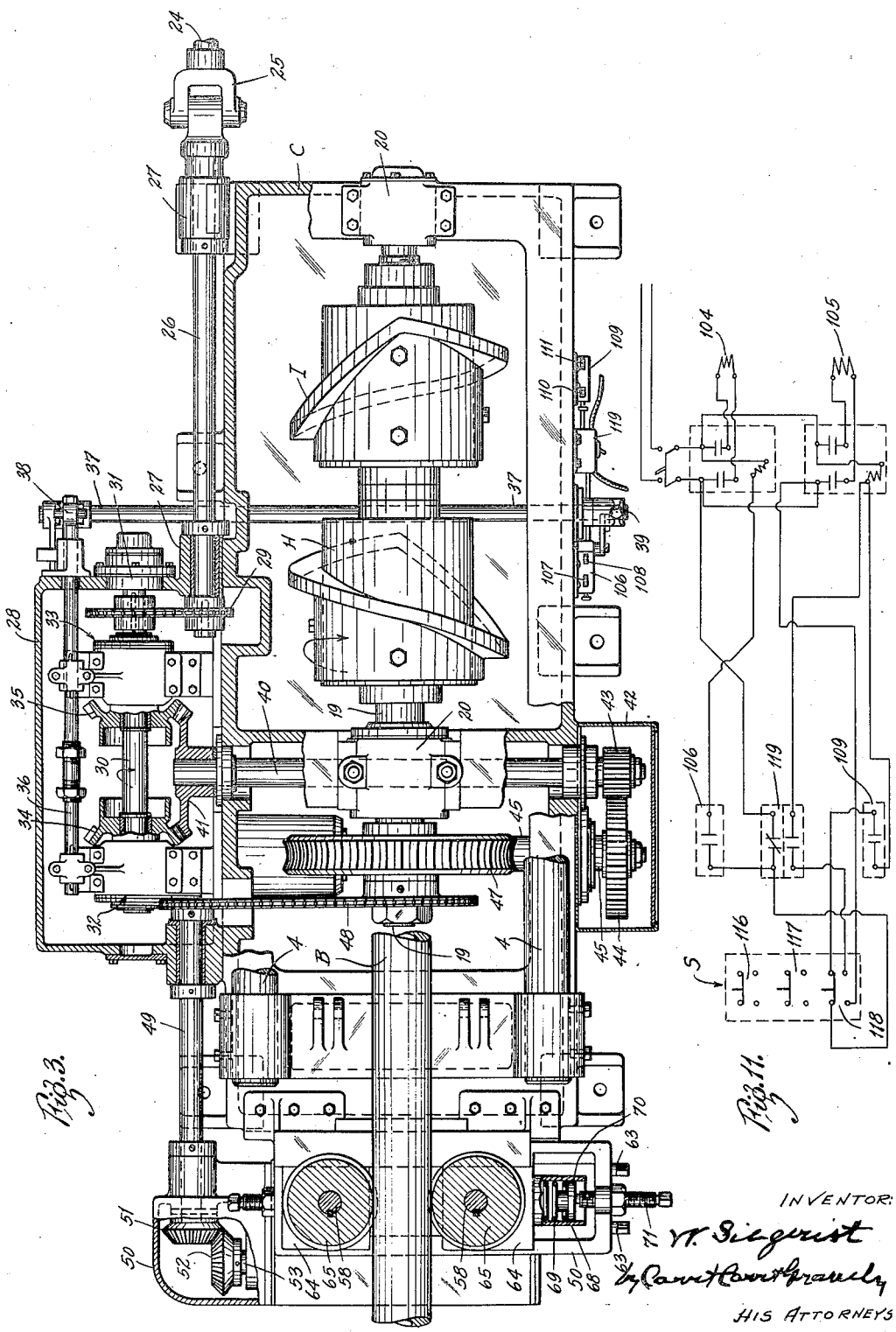
Figure 4:
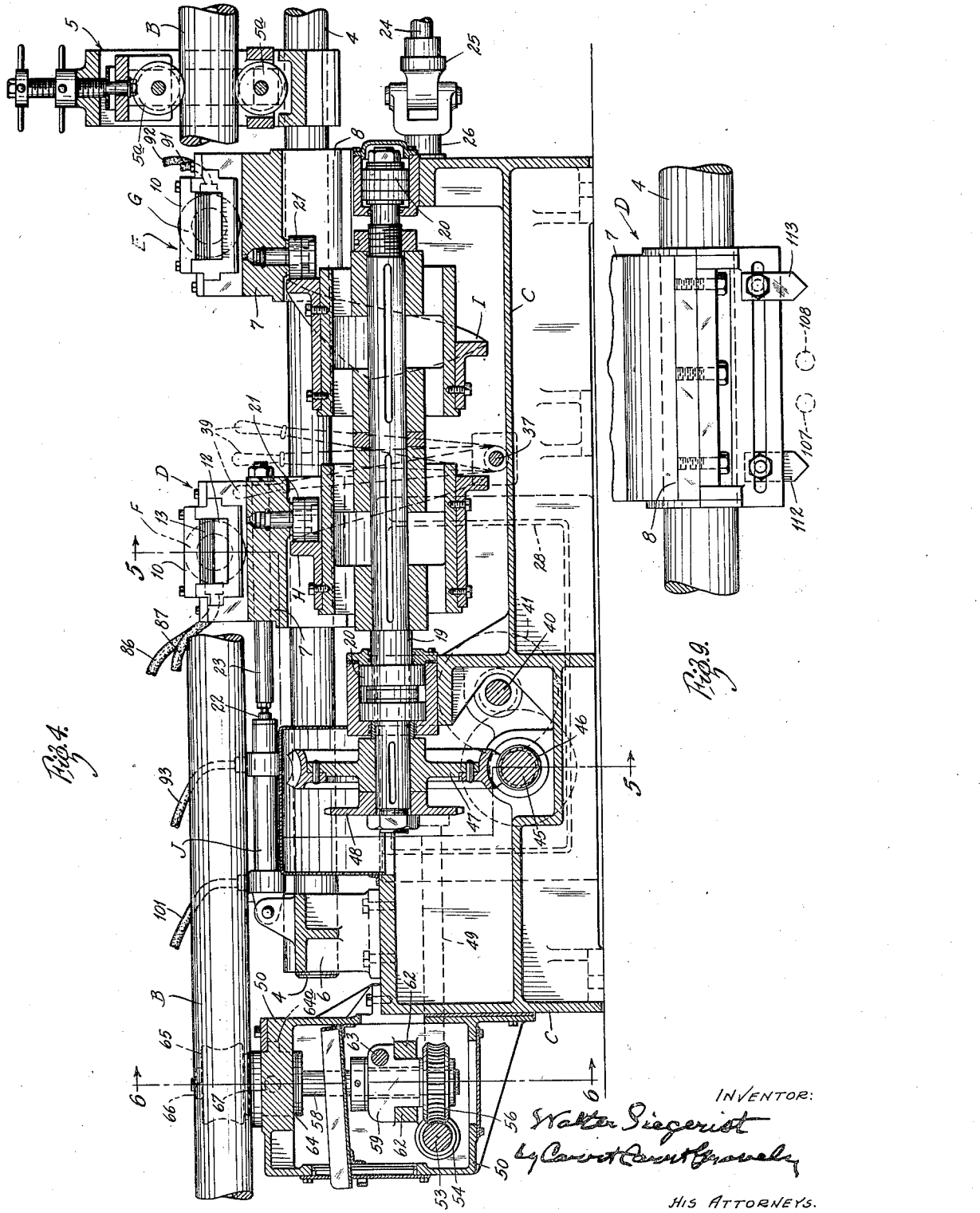
Figure 5:
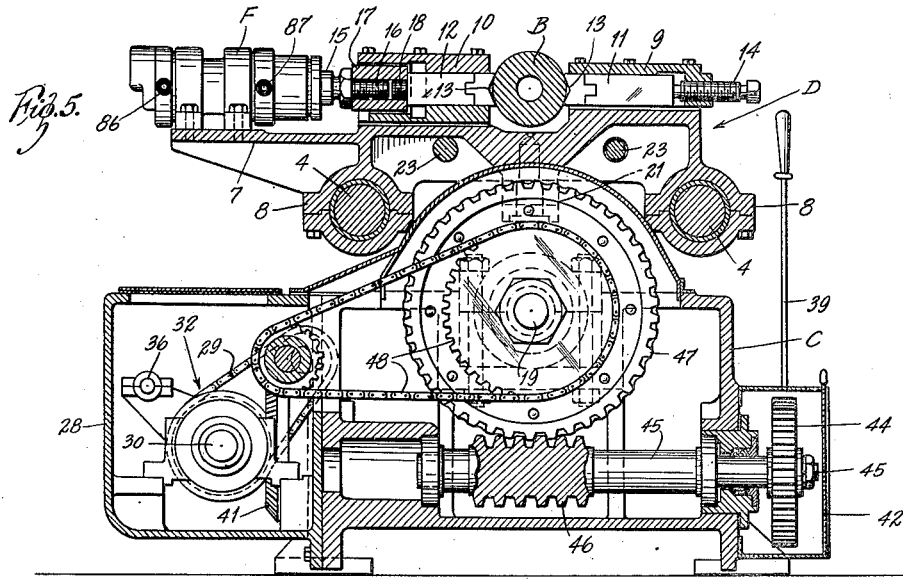
Figure 6:
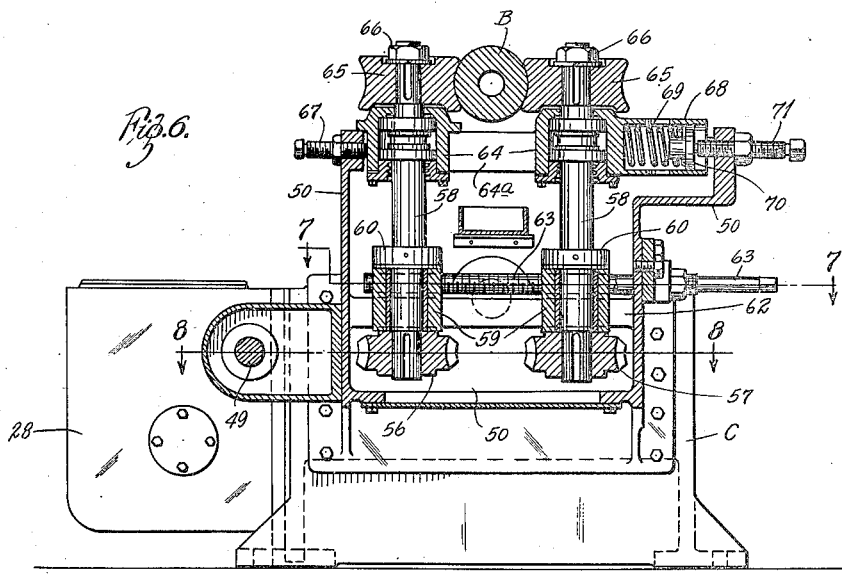
Figures 7, 8:
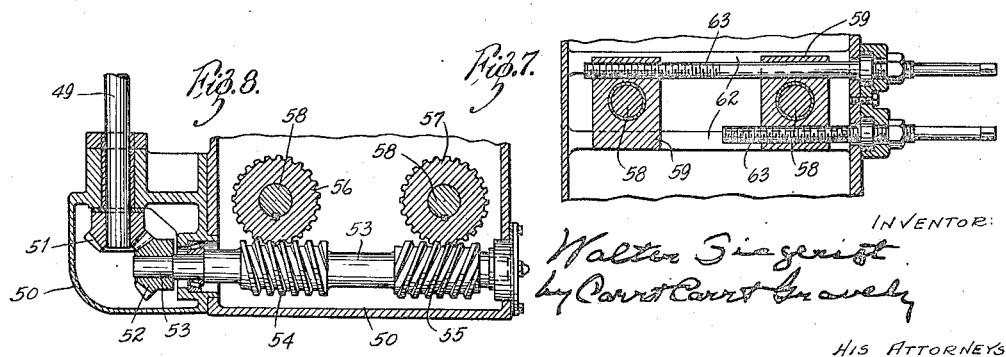

In the accompanying drawings, which form part of this specification and wherein like symbols refer to like parts wherever they occur, Fig. 1 is a plan view of a bar turning machine provided with a feeding mechanism embodying my invention, Fig. 2 is a side elevational view of the parts shown in Fig. 1, Fig. 3 is a part top plan and part horizontal sectional view of the bar stock feeding mechanism, Fig. 4 is an enlarged central vertical longitudinal section on the line 4—4 in Fig. 1, Figs. 5 and 6 are vertical cross-sections on the lines 5—5 and 6—6, respectively, in Fig. 4, Figs. 7 and 8 are fragmentary horizontal sections on the lines 7—7 and 8—8, respectively, in Fig. 6, Fig. 9 is an enlarged side elevational view of a portion of one of the carriage supporting rails and the lower outside corner portion of one of the grip carriages slidable thereon, Fig. 10 is a diagrammatic view, showing the hydraulic control circuit for the cylinders, which engage and disengage the bar gripping devices of the carriages, and for the cylinders, which impart the return movement to said carirages.

Fig. 11 is a view showing the electric control circuit for the hydraulic circuit shown in Fig. 10; and Fig. 12 is a view, similar to Fig. 10, showing a modified hydraulic control circuit for the carriage pull-lock cylinders and for the cylinders for opening and closing the bar gripping devices.

In the accompanying drawings, my invention is illustrated in connection with a machine for turning or finishing relatively long bar stock of circular section. The cutting unit of such a machine comprises a housing A having an opening (not shown) that extends horizontally therethrough and contains one or more rotary cutterheads (not shown) through which the bar stock B is fed axially. The cutterhead housing A also contains suitable mechanism (not shown) for driving the cutter heads, said mechanism including a shaft 1 journaled in said housing and a pulley 2 fixed to an exposed end of said shaft and driven by a belt 3. The above machine also includes spaced, parallel horizontally disposed work carriage supporting rails or runner bars 4 that project from the housing A on both input and output sides thereof, said rails being spaced apart equal distances on opposite sides of the vertical plane of the rotary cutter axis. Said machine also includes suitable steady rests 5 that are supported on and fixed to the slide rails 4 near the input and output sides of the cutterhead housing A, each of said steady rests having a pair of vertically adjustable, horizontally disposed rolls 5a journaled therein, between which the bar stock B is guided and supported. The bar turning machine thus far described is well known and it is considered unnecessary to illustrate it in detail.

Located beneath the slide rails 4 on the input side of the cutterhead housing A, just in advance of the steady rest 5 on that side of said housing is a housing C having a crosshead 6 that rests on and is bolted to the top thereof near the front end thereof and serves to rigidly connect and support the forward ends of said rails. Supported on the slide rails 4 for sliding movement longitudinally thereof above the housing C are two carriages D and E of identical construction. Each of these carriages comprises a body 7 having tubular portions 8 on the lower side thereof that are sleeved on the respective side rails 4, and a bar gripping or clamping device comprising alined slideways 9 and 10 disposed crosswise of said carriage at the top thereof one on each side of the longitudinal center line of the machine and clamp blocks 11 and 12 slidable towards and away from one another in the respective slideways into and out of engagement with the stock disposed therebetween. The opposing stock engaging ends of the clamp blocks 11 and 12 are grooved, as at 13, to prevent the stock from turning. The clamp block 11 is adjustably held against outward movement in its slideway 9 by means of a stop screw 14 mounted in the carriage in abutting relation to the outer end of said block. The other clamp block 12 of each grip carriage is moved in its supporting slideway 10, towards and away from the slide block 11 to rigidly clamp the work between said blocks, by means of a hydraulic cylinder, the cylinders for the carriages D and E being indicated at F and G, respectively, in the accompanying drawings. Each of the fluid cylinders F and G has a piston 15 working therein which is provided with a piston rod 16 that is threaded into one end of a coupling member 17, the other end of which is threaded onto a stud 18 provided therefor on the outer end of the clamp block or jaw 12.

The grip carriages D and E are moved along the slide rails 4 in direction of the cutterhead housing A, by rotary drum or barrel cams H and I, respectively, that are rigidly secured to for joint rotation with a horizontal shaft 19 that extends lengthwise of the housing C below said carriages along the longitudinal center line of the machine and are journaled in suitable bearings 20 provided therefor in said housing. Each of the grip carriages has a cam roller 21 journaled on the underside thereof for rotation on a vertical axis, said cam roller being located in advance of the actuating cam for that carriage and being in rolling contact with the cam face thereof. As shown in the drawings, the cylindrical cams H and I are identical and rotate together with the cam shaft 19. Said cams are, however, offset circumferentially relative to one another approximately one hundred-eighty degrees so that the carriage D starts its feeding movement and reaches the end thereof in advance of the carriage E, while the feeding rate of both carriages is the same when the gripping devices thereof are engaged with the bar stock B. The two cams move the carriages only in the direction of the cutterhead housing A, that is, in work feeding direction.

The cam roller of the carriage D is held in contact with the active or radial face of the operating cam H therefor by means of a hydraulic cylinder J and the cam roller of the carriage E is likewise held in contact with the operating cam I therefor by means of a similar fluid cylinder K. These cylinders also return the carriages to feed starting position after the peak or rise of a cam no longer moves the cam roller of the carriage forward, thereby causing it to ride on the drop or receding portion of said cam. The cylinders J and K are arranged one on each side of the longitudinal center line of the machine with their front ends mounted for vertical swinging movement on the side rail supporting crosshead 6. The two cylinders extend in the direction of the carriages and the pistons 22 mounted therein have piston rods 23 extending from the free ends thereof, the rod of the piston in the cylinder J being rigidly secured to the carriage D and the rod of the piston in the cylinder K being similarly secured to the carriage E. The cams H and I and the draw-back cylinders J and K are arranged so that one carriage reaches the end of its work feeding movement and is drawn back to starting position before the other carriage reaches the end of its work feeding movement.

The mechanism for rotating the cam shaft 19 in the housing C is driven from the cutterhead housing A by a shaft 24 that projects horizontally from the input or stock receiving side thereof of said cutterhead housing. The shaft 24 has universal joint connections 25 with a horizontal shaft 26 journaled in suitable bearings 27 provided therefor on one side of the housing C, which is extended laterally on that side to form a box 28 into which said shaft extends. The shaft 26 has a sprocket wheel-and-chain driving connection 29 inside of the box 28 with a horizontal shaft 30 journaled in suitable bearings 31 therein. The shaft is provided with two similar clutches 32 and 33, respectively, preferably of the oil plate multiple-disk type. The driven element of the clutch 32 has a bevel pinion 34 thereon; and the driven element of the other clutch 33 has a bevel pinion 35. The movable elements of the clutches 32 and 33 are simultaneously actuated to selectively engage either element while disengaging the other by means of a horizontal clutch shifter rod 36, which projects from the box 28 and which is shifted axially in either direction by means of a horizontal rocker shaft 37 that has a rocker arm connection 38 with the projecting end of said rod and extends crosswise of the housing C to the opposite side thereof where it is provided with an upright operating lever 39.

The cam shaft 19 is driven in either direction from the clutch shaft 30 through a horizontal shaft 40 that is disposed crosswise of the housing C with one end projecting into the clutch box 28 and having a bevel gear 41 fixed thereto that intermeshes continuously at diametrically opposite points with the two bevel clutch shaft pinions 34 and 35 on the driven members of the clutches 32 and 33, respectively, whereby said cross shaft may be driven in one direction when the one pinion is connected to the clutch shaft and in the opposite direction when the other pinion is clutched thereto. The cross shaft 40 projects beyond the opposite side of the housing C into a box 42 where it is provided with a spur pinion 43 that intermeshes with a spur gear 44 fixed to the adjacent end of a horizontal worm shaft 45 that is journaled in said housing alongside of said cross shaft. The worm 46 on the worm shaft 45 intermeshes with a worm gear 47 fixed to the cam shaft 19 located thereabove. This end of the cam shaft 19 has a sprocket chain-and-wheel connection 48 with a horizontal shaft 49 journaled in suitable bearings provided therefor in the clutch box 28 and in a box 50 fixed to the forward end of the housing C. Located in the box 50 are two intermeshing beveled gears 51 and 52, the gear 51 being fixed to the shaft 49 and the gear 52 being fixed to the adjacent end of a horizontal cross shaft 53 which is journaled in the box 50 and has a left-hand worm through a pressure limiting or reducing valve 94, a check valve 95 and a pressure reducing valve 96 to the free end of the pull-back cylinder J for the carriage D; and a conduit 97 leads from the free end of said cylinder to the free end of the pull-back cylinder K for the carriage E. A conduit 98 leads from the four-way valve 90 to the relief valve 96 in the conduit 93 and has a branch 99 leading to the four-way valve 85, and a branch 100 opening into the tank 72. A return conduit 101 leads from the pivoted ends of the pullback cylinders J and K to the tank 72, and has a branch 102 communicating with the pressure reducing valve 94 in the conduit 93. A return conduit 103 also leads from the relief valve 96 to the conduit 93 at a point therein between the pressure reducing valve 94 and check valves 95.

In the position of the parts shown in the diagram of Fig. 10, the machine is loaded and feeding stock into the rotary cutterheads in the housing A, the clamp of the carriage E is closed and this carriage is moving to the right under cam influence at feed rate, and the clamp of the carriage D is open and this carriage is moving to the left under hydraulic influence of the cylinder J and at a rapid traverse rate. In this phase of the feeding cycle, the piston of the cylinder K is forcing oil from said cylinder through the conduit 97 into the cylinder J; and both pumps 73 and 74 are delivering their respective maximum deliveries at a relatively low pressure through the conduits 78 and 79 and check valves 80 and 81 to merge into the connecting conduit 82. From this conduit 82, the maximum quantity, low pressure fluid flows through the conduit 93, the now fully opened pressure reducing valve 94, check valve 95, relief valve 96 into the pull-back cylinder J for the carriage D. Clamping pressure on the head end of the clamping cylinder G of the carriage E is at a considerably higher pressure, which higher pressure is also obtained in the conduit 88, thus closing check valve 89 against back flow or pressure from said conduit into the outlet conduit 79 of the pump 74 and the low pressure pump circuit. Thus, the clamping force is retained, while the higher pressure is also retained at the rod end of the clamping cylinder F of the carriage D and in the conduit 83 by the closed check valve 84 in the latter. When the piston in the pull-back cylinder J for the carriage D reaches the end of its return stroke, the carriage travel is reversed by the operating cam, and both carriage and piston begin moving to the right at feeding rate. As a result of this piston movement, the pressure rises in the pump circuit and, an excess of oil now being present in the conduit 93 between the check valve 95 and cylinder J, the check valve closes and such excess oil is discharged into the tank 72 from the relief valve 96 through the conduits 98 and 100. This discharge is made at a pressure slightly higher than the pressure in the conduit 93 between the pressure reducing valve 94 and check valve 95 in said conduit, because the pressure in said conduit between the relief valve 96 and the cylinder J acts on one side of said relief valve while the pressure in said conduit between the cylinder J and said relief valve acts on the opposite end of the latter. Likewise, the pressure rise acts on the unloading valves of the pumps 73 and 74 to unload the large volume delivery of both pumps. Thus, high pressure conditions are re-established throughout the circuit. However, the pressure reducing valve 94 in the conduit 93 tends to maintain a lower pressure level in the pull-back cylinder circuit than exists in the clamping cylinder circuits.

The four-way control valve 85 for the clamp operating cylinder F of the carriage D is operated by means of a solenoid 104; and the four-way control valve 90 for the clamp operating cylinder G is likewise operated by a solenoid 105. The solenoid 104 is controlled by a limit switch 106 having two roller contact arms 107 and 108, while the solenoid 105 is controlled by a similar limit switch 109 having two roller contact arms 110 and 111. As shown in Fig. 2, the limit switch 106 is fixed to the side of the housing C adjacent to the carriage D, while the limit switch 109 is fixed to said housing adjacent to the carriage E.

As shown in Figs. 2 and 10, the carriage D has two dogs 112 and 113 fixed thereto and spaced apart thereon in the direction of the carriage travel; and the carriage E has a pair of similarly spaced dogs 114 and 115 fixed thereto for movement therewith. The dogs 112 and 113 are adapted to actuate the limit switch 106 and the dogs 114 and 115 being adapted to actuate the limit switch 109. As the feeding movement of both carriages continues a short distance, the dog 113 on the carriage D trips the arm 108 of the limit switch 106 to thereby energize the solenoid 104 of the four-way valve 85. The solenoid 104 then shifts the valve 85 to direct the fluid pressure from the conduit 83 and through the flexible conduit 86 to the head end of the clamping cylinder F of the carriage D and thus closes the clamp of said carriage. Coincidental with the flow of oil into the head end of the clamping cylinder F, the pressure drops in the circuit. The check valve 80 then closes as the result of this pressure drop so that this branch of the circuit is divorced from the other two circuits which remain at high pressure condition. Likewise, the pump unit 73 responds to the pressure change and starts large volume, low pressure delivery for fast clamping, the clamp engages the bar, the pressure rises again and the circuit and pump unit revert to their respective previous condition of operation.

The rightward or feeding movement of the two carriages continues for a distance with both clamps engaging the bar until the dog 114 engages the arm 110 of the limit switch 109, thereby de-energizing the solenoid 105 of the four-way valve 90 which directs the fluid from the head end of the clamping cylinder G through the conduits 98 and 100 for flow to the tank 72 and which also directs fluid from the conduit 88 to the rod end of said clamping cylinder and thus opens the clamp of the carriage E. The flow of fluid for displacing the piston of the clamp operating cylinder G of the carriage E produces a pressure drop in this branch of the circuit, so that the check valve 81 then closes to dissociate this branch from the other circuits. Likewise, the pump unit 74 responds to this drop in pressure and starts low pressure, high volume delivery. As before, this condition prevails until the piston in the clamp operating cylinder G of the carriage reaches the end of its stroke.

A moment later, the cam that feeds carriage E enters its receding phase, and the piston in the pull-back cylinder K for said carriage begins its rapid return movement. The fluid flow causes pressure to drop in the pull-back cylinder circuit, so both pumps 73, 74 then re-act to supply a large 54 and a right-hand worm 55 thereon. These worms mesh with worm gears 56 and 57 that are fixed respectively to the lower ends of two upright shafts 58 that are located in the box 50 and are spaced apart crosswise thereof. Each shaft 58 is journaled in a lower bearing block 59 located between the worm gear on the lower end thereof and a collar 60 that is fixed to said shaft and seats upon the upper end of said bearing. Each bearing block 59 is supported on a cross slideway 62 provided therefor in the box 50 and is adjustable along said slideway by means of a screw 63 that is threaded horizontally through said bearing block and is mounted for rotary but non-axial sliding movement in the side wall of said box, said screw extending outside of the box, for purposes of adjustment. Each shaft 58 is journaled at its upper end in a bearing block 64, which is supported on a cross slideway 64a formed in the upper portion of the box 50; and each shaft has a grooved feed roller 65 fixed thereto between the bearing housing and a nut 66 threaded on the upper end of said shaft. One of the bearing blocks 64 is held against movement away from the other bearing block by means of an adjusting screw 67 that is threaded through the side wall of the box 50 in abutting relation to the adjacent outer side face of said first mentioned block. The other bearing block or housing is provided on its outer side face with an outstanding tubular extension 68 containing a coil compression spring 69 that seats in the inner end of the bore of said extension and against a spring seat member 70 axially slidable in said bore. A screw 71 is threaded through the side wall of the box 50 with its inner end disposed in abutting relation to the spring seat member 70, whereby the compression of the spring 69 may be adjusted by manipulating said screw. Thus, the feed roller 65 carried by the shafts 58 journaled in the spring loaded bearing housing is adapted to yield to accommodate slight changes in the diameter of the bar stock B as it passes between the two feed rollers.

The bar stock B is usually of considerable length, and each grip carriage feeds the stock through the cutterhead housing A for a limited distance at intermittent intervals and performs a portion of its feeding function during the time interval required for the return movement of the other carriage to starting position. In other words, the feeding movements of the two carriages overlap to provide a continuous feeding movement of the bar stock. The rate of feeding is mechanically controlled by the cams H and I, which move the carriages in the feeding direction only and which also regulate the rate at which the carriages return to starting position under the pull of hydraulic cylinders J and K, which also serve to preload the cam rollers 21 and thus hold them in contact with their respective cams, thereby eliminating play or back lash therebetween. Thus, the feeding cycles of the two carriages are definitely maintained in synchronism and in proper timed relation to the cutting elements in the cutterhead housing A.

The start of the complete cycle consists of a stock feeding operation in a manual loading phase, during which a bar stock B is placed into feeding position between the power driven feed rolls 65 and fed thereby to the carriage D and E; a starting phase, during which the stock clamp of one carriage is closed and forward feeding of both carriages is begun; a second clamping phase, during which the stock clamp of the second carriage is closed and the stock is fed by both carriages at the same rate of travel; an unclamping phase, during which the clamp of the first carriage is opened and feeding is continued by the second carriage; a first reversal phase, during which the first carriage is hydraulically returned by its pull-back cylinder to starting position against the receding cam face and the second carriage continues to feed forward; a second reversal phase, during which the first carriage is reversed by its cam to again feed forward, while the second carriage still feeds forward; a reclamping phase, during which the clamp of the first carriage is again closed as forward feeding of the bar continues; a second unclamping phase, during which the clamp of the second carriage is opened and uninterrupted feeding continues; a third reversal phase, during which the second carriage is returned by its pull-back cylinder to starting position against the receding face of its operating cam, while the first carriage continues its forward feed; and a fourth reversal phase, during which the second carriage is reversed by its cam for forward feeding. This cycle repeats automatically until the end of the bar is reached or the control lever 39 is moved to neutral, clutch disengaging position. In actual practice, another bar is abutted endwise against the trailing end of the bar being turned at the proper time without stopping the machine.

The hydraulic circuit for controlling the clamp opening and closing cylinders F and G and the carriage pull-back cylinders J and K is shown diagrammatically in Fig. 10. This circuit includes a suitably located tank or reservoir 72 for oil or other fluid and duplicate pumps 73 and 74 that are simultaneously driven at the same rate of speed by a single electric motor 75 operatively connected thereto, each pump having an inlet pipe 76 and a return pipe 77 extending into said tank. Each of these pumps is a "Vickers" or similar double pump and combination valve unit of the type having a capacity for delivering a relatively large quantity of oil at a comparatively low pressure and a relatively small quantity of oil at comparatively high pressure. The pump valve unit of each pump is responsive to pressure conditions within the circuit to bring about the change in the quantity of the oil delivery, one valve of each unit being adapted to unload a large volume delivery of the pump to the tank at substantially no pressure, and the other valve simultaneously closing off communication between the respective pumps, whereby a small delivery is maintained at a higher pressure.

The hydraulic circuit also includes outlet conduits 78 and 79 for the pumps 73 and 74, respectively, communicating through check valves 80 and 81, respectively, with a connecting conduit 82. A conduit 83, having a check valve 84 therein, leads from the delivery conduit 78, between the check valve 80 therein and the pump 73, to a four-way valve 85; and flexible conduits 86 and 87 lead from said four-way valve to opposite ends of the clamp operating cylinder F of the carriage D. A conduit 88, having a check valve 89 therein, leads from the delivery conduit 79, between the check valve 81 therein and the pump 74, to a four-way valve 90; and separate flexible conduits 91 and 92 lead from said four-way valve to opposite ends of the clamp operating cylinder G of the carriage E. A conduit 93 leads from the connecting conduit 82 utilizes the pressure developed in the pull-back cylinders during the mechanical or cam feed of the carriages controlled thereby to actuate the cylinders carried by said carriages to close the bar stock gripping devices, such pressure being at a maximum after the carriages start their feed movement, at which time a maximum pressure and maximum fluid volume are required for embedding the teeth 11 and 12 of the grip jaws into the bar stock B. This modified circuit permits the use of single, smaller pump and also reduces the working pressure of the pump by the use of pull-back cylinders of proper diameter. It is possible to use the pull-back cylinders entirely for high pressure fluid service to hold the jaws in closed position, the grip jaws always being actuated after the grip carriage starts forward and always being released before the grip carriage reaches the end of its feed stroke. Consequently there is a discharge of fluid from the pull-back cylinders during the entire gripping period, and any desired pressure may be obtained from said cylinders merely by regulating the back pressure through the relief or back pressure discharge valves in the control circuit for the cylinders for opening and closing the grip jaws.

While I have described my invention in connection with a machine for turning and finishing bar stock, it is obviously applicable to other types of machines having reciprocable work feeding carriages.

What I claim is:

1. A mechanism for feeding work through a cutting device at a uniform rate predetermined by the nature of the material in said work and the capacity of said cutting device, said mechanism comprising a reciprocable carriage operable in one direction of its reciprocating movement to feed said work to said cutting device and in the other direction of its reciprocating movement to move relative to said work, mechanically operated means for moving said carriage in the work feeding direction of its reciprocating movement, and fluid operated means for moving said carriage in the other direction of its reciprocating movement, the force exerted by said fluid operated means on said carriage in said other direction of its reciprocating movement being uniform in all positions of said carriage, whereby said fluid operated means renders uniform the rate of travel imparted to said carriage by said mechanically operated means.

2. A mechanism for feeding work through a rotary cutting device at a uniform rate predetermined by the nature of the material in said work and the capacity of said cutting device, said mechanism comprising a reciprocable carriage operable in one direction of its reciprocating movement to feed said work to said cutting device and in the other direction of its reciprocating movement to move relative to said work, mechanically operated cam means for moving said carriage in the work feeding direction of its reciprocating movement, a fluid pressure cylinder for moving said carriage in the other direction of its reciprocating movement, the force exerted by said fluid pressure cylinder on said carriage in said other direction of its reciprocating movement being uniform in all positions of said carriage, and an operative connection between said cam means and said fluid pressure cylinder, whereby said cam means determines the rate of travel imparted to said carriage by said fluid pressure cylinder and said fluid pressure cylinder renders uniform the rate of travel imparted to said carriage by said cam means.

3. A work feeding mechanism comprising a reciprocable carriage, work gripping elements on said carriage, mechanical means for moving said carriage in one direction of its reciprocating movement, fluid operated means for moving said carriage in the other direction of its reciprocating movement, and fluid operated means for moving said work gripping means into work gripping position when said carriage is moving in one direction only of its reciprocating movement.

4. A work feeding mechanism comprising a reciprocable carriage, work gripping elements on said carriage, cam means for moving said carriage in one direction of its reciprocating movement, fluid pressure operated means for moving said carriage in the other direction of its reciprocating movement, and fluid pressure means controlled by the reciprocating movement of said carriage for moving said gripping elements into operative position during the actuation of said carriage by said cam means and for holding said elements in inoperative position during the actuation of said carriage by said fluid pressure means.

5. A work feeding mechanism comprising a reciprocable carriage, work gripping means on said carriage, mechanically operated means for moving said carriage in one direction of its reciprocating movement, and a fluid pressure circuit including a fluid pressure cylinder for moving said carriage in the other direction of its reciprocating movement and a fluid pressure cylinder for moving said work gripping means into operative position during movement of said carriage in one direction and for holding said gripping means in inoperative position during movement of said carriage in the other direction.

6. A work feeding mechanism comprising a reciprocable carriage, work gripping means on said carriage, mechanically operated means for moving said carriage in one direction of its reciprocating movement, and a fluid pressure circuit including a fluid pressure cylinder for moving said carriage in the other direction of its reciprocating movement, a fluid pressure cylinder for moving said work gripping means into operative position during movement of said carriage in one direction and for holding said gripping means in inoperative position during movement of said carriage in the other direction, and a control valve for said cylinder, and means controlled by the reciprocating movement of said carriages for electrically controlling said control valve.

7. A mechanism for continuously feeding work through a cutting device at a uniform rate predetermined by the nature of the material in said work and the capacity of said cutting device, said mechanism comprising two reciprocable carriages operable in one direction of their reciprocating movement to feed said work to said cutting device and in the other direction of their reciprocating movement to move relative to said work, mechanically operated means for moving said carriages in work feeding direction with one carriage leading the other, fluid operated means for imparting a complete return movement to said carriages with the leading carriage completing its return movement before the trailing carriage reaches the end of its feed movement, the force exerted by said fluid operated means on said carriages in the direction of their return movement being uniform in all positions of said volume delivery at low pressure. This pressure level, however, is equal to that normally maintained beyond the pressure reducing valve 94, so the feeding circuit suffers no radical change in resistance to the return movement of the piston in the pull-back cylinder K of the then returning carriage E. As before, the check valves 84 and 89 close for holding the higher pressure lever in the clamping circuit, so the clamp operating cylinders are unaffected.

The cam I reverses the motion of carriage E for rightward or forward feed when it nears the end of its stroke. After a short distance of such feed has been accomplished, the dog 115 actuates the arm 111 of the limit switch 109 to thereby energize the solenoid 90, whereby the four-way valve 90 is shifted to direct fluid from conduit 88 to the head end of clamping cylinder G of the carriage E and moves said clamp into stock gripping position, as before.

Subsequently, dog 112 of the carriage D actuates the arm 107 of the limit switch 106 to deenergize the solenoid 104, thereby causing the four-way valve 85 to shift to a position that will direct the unclamping pressure through the flexible conduit 87 to the rod end of the cylinder F of the carriage D and unclamping proceeds. Again, pressure drop due to flow effects the changes described in explanation of the clamping operation. An instant later, the cam H which governs the feed movement of the carriage D enters its receding phase and the piston in the pull-back cylinder J for the carriage D then begins its rapid carriage return movement under circuit conditions previously described.

The electric circuit for controlling the above hydraulic circuit is shown in Fig. 11 and includes the limit switches 106 and 109, which control the solenoids 104 and 105 for operating the four-way valves 85 and 90, a suitable push button station S, including a starting switch 116, a stop switch 117 and a withdrawal or reversing switch 118, and a limit switch 119, mounted on the housing C in position to be actuated by the clutch shift lever 39 to de-energize both solenoids and thereby release the stock gripping devices of both carriages.

In operation, the dog 113 carried by the left-hand clamp D trips the contact arm 108 of the limit switch 106, thereby energizing the solenoid 104 and causing the clamp device of this carriage to grip the work. The dog 114 of the right-hand carriage E then trips the contact arm 110 of the limit switch 109, thereby de-energizing the solenoid 90 and causing the clamped device of this carriage to release the work. The dog 115 of the right-hand carriage E then trips the contact arm 111 of the limit switch 109, thereby energizing the solenoid 105 and causing the clamp device of this carriage to grip the work. The dog 112 of the left-hand carriage D then trips the contact arm 107 of the limit switch 106, thereby de-energizing the solenoid 104 and causing the clamp device of this carriage to release the work. The dog 113 of the left-hand carriage D then trips the roller 108 of the limit switch 106, thereby again energizing the solenoid B and the above described cycle is repeated.

The machine is started by shifting the clutch lever 39 to the right, thereby causing the feed rollers 65 and the cams H and I to rotate in the direction that will feed the work in the direction of the cutterhead housing A. The bar stock B is fed into the feed rollers 65 which feed the bar into the gripping devices of the two carriages in the manner hereinbefore described. The pump operating motor 75 is started and stopped by the start and stop push buttons 116 and 117, respectively.

If, for any reason, it is necessary to draw the bar from the machine before it is completely turned, such withdrawal is accomplished in the following manner the forward feed of the bar is stopped by reversing the clutch shift lever 39 so as to operate the limit switch 119 and de-energize the solenoids 104 and 105, thus bringing about the release of the work gripping devices of both carriages. The reverse push button 118 is then depressed as the right-hand carriage starts on its return stroke and is released as said carriage starts its feed stroke, thereby gradually withdrawing the bar from the machine by an "inching" process, with only the right-hand carriage gripping and returning the work. The gripping device of the right-hand carriage releases the work as soon as the reverse button 118 is released.

Fig. 12 illustrates a modified form of hydraulic control circuit for the carriage pull-back cylinders J and K and the clamp opening and closing cylinders F and G. This modified circuit includes the four-way valve 85, the solenoid 104 for operating said valve, and the flexible conduits 86 and 87 that lead from said valve to opposite ends of the clamp actuating cylinder F of the left-hand carriage D; and it also includes the four-way valve 90, the solenoid 105 for operating said valve, and the flexible conduits 91 and 92 that lead from said valve to the opposite ends of the clamp operating cylinder G of the right-hand carriage E.

The hydraulic circuit shown in Fig. 12 also includes a suitably located tank or reservoir 120 for oil or other fluid, and a single pump 121 that is driven by an electric motor 122. The pump 121 has inlet pipes 123, 124 and outlet conduits 125, 126. The conduit 125 leads from the pump 121 through a pressure reducing valve 127, a check valve 128 and a pressure reducing valve 129 to the four-way valve 85; and the conduit 126 leads from said pump through a pressure reducing valve 130, a check valve 131 and a pressure reducing valve 132 to the four-way valve 90.

The four-way valves 84 and 90 are connected by a conduit 133 which opens into the tank 120. A return conduit 134 leads from the pivoted or head ends of the pull-back cylinders J and K to the tank 120. The pressure reducing valves 127 and 129 in the conduit 125 leading from the pump 121 to the four-way valve 85 are connected by a conduit 135. The pull-back cylinder J for the left-hand carriage D is placed in communication with the circuit for controlling the clamp opening and closing cylinder F of that carriage, by means of a conduit 136, which leads from the rod end of said cylinder to the conduit 125 between the check valve 128 and the pressure reducing valve 129 therein. The pull-back cylinder K for the right-hand carriage E is in continuous communication with the circuit for operating the clamp opening and closing cylinder G of said carriage by means of a conduit 137, which leads from the rod end of the pull-back cylinder to the conduit 126 between the check valve 131 and the pressure reducing valve 132 therein.

By this arrangement, the piston in each of the pull-back cylinders J and K operates during the cam operated feed movement of the carriage associated therewith to build up the pressure in said cylinder and transmit such pressure through the conduits 136 or 137 to the head end of the clamping cylinder for that carriage and thus clamp the bar stock thereto. Thus, this modified circuit carriages, whereby said fluid operated means renders uniform the rate of travel of the feed movement imparted to said carriages by said mechanically operated means.

8. A mechanism for continuously feeding work through a rotary cutting device at a uniform rate predetermined by the nature of the material in said work and the capacity of said cutting device, said mechanism comprising two reciprocable carriages operable in one direction of their reciprocating movement to feed said work to said cutting device and in the other direction of their reciprocating movement to move relative to said work, mechanically operated cam means for moving said carriages in work feeding direction with one carriage leading the other, fluid pressure cylinders for imparting a return movement to said carriages with the leading carriage completing its return movement before the trailing carriage reaches the end of its feed movement, the force exerted by said fluid pressure cylinders on said carriages in the direction of their return movement being uniform in all positions of said carriages, and operative connections between said cam means and said fluid pressure cylinders, whereby said cam means regulates the rate of travel of the return movement imparted to said carriages by said fluid pressure cylinders and said fluid pressure cylinders render uniform the rate of travel of the feed movement imparted to said carriages by said cam means.

9. A work feeding mechanism comprising two reciprocable carriages, mechanically operated means for moving said carriages in work-feeding direction with one carriage leading the other, and fluid operated means for imparting a complete return movement to the leading carriage before the trailing carriage reaches the end of its feed movement, work gripping devices carried by the respective carriages, and fluid pressure operated means for successively closing and opening the work gripping devices of each carriage during the feed movement thereof and for holding said devices open during the return movement of said carriage.

10. A work feeding mechanism comprising two reciprocable carriages, mechanically operated means for moving first one and then the other of said carriages in one direction, fluid pressure operated means for moving said first and then said second carriage in the opposite direction, work gripping devices carried by said carriages, and fluid pressure means carried by said carriages for closing and then opening the work gripping devices of first one and then the other of said carriages during the movement thereof in said first direction and for holding said devices open during the entire movement of said carriages in said other direction.

11. A work feeding mechanism comprising two reciprocable carriages, cam operated means for moving first one and then the other of said carriages in one direction only, fluid pressure operated means for moving said first and then said second carriage in the opposite direction only, work gripping devices carried by said carriages, and fluid pressure means carried by said carriages for closing and then opening the work gripping devices of first one and then the other of said carriages during the movement thereof in said first direction and for holding said devices open during the entire movement of said carriages in said other direction, said cam means being operable to regulate the rate of travel imparted to said carriages by said fluid pressure operated means.

12. A work feeding mechnism comprising two reciprocable carriages, separate mechanically operated means for moving said carriages in one direction, separate fluid pressure operated means for moving said carriages in the opposite direction, work gripping devices carried by the respective carriages in operative relation to the same workpiece, each of said carriages carrying fluid pressure operated means for alternately closing and opening the work gripping device on the same carriage therewith at predetermined points in the cycle of operation of said carriage so related that at all times at least one of said work gripping devices is closed.

13. A work feeding mechanism comprising two reciprocable carriages arranged one behind the other, duplicate cams mounted for joint rotation about a common axis and cooperating with the respective carriages for moving the same in one direction, said cams being offset circumferentially so that one carriage starts and finishes its movement in advance of the other, fluid pressure cylinders operatively connected to the respective carriages for moving the same in the opposite direction, work gripping devices carried by the respective carriages in operative relation to the same workpiece, and fluid pressure cylinders mounted on and controlled by the movement of the respective carriages for closing the gripping device of at least one of said carriages during the movement thereof in said first mentioned direction and for holding the gripping device of each carriage open during the movement thereof in said second mentioned direction.

14. A work feeding mechanism comprising two reciprocable carriages arranged one behind the other, cam rollers on the respective carriages, longitudinally spaced duplicate cams mounted for joint rotation about a common axis and cooperating with the cam rollers of the respective carriages for moving the latter in one direction only, said cams being offset circumferentially, whereby one carriage lags behind the other during the movement of said carriages in said direction, fluid pressure cylinders operatively connected to and controlled by the movement of the respective carriages for moving the same in the opposite direction only, work gripping devices carried by the respective carriages in operative relation to the same workpiece, and fluid pressure cylinders mounted on and controlled by the movement of the respective carriages for closing the work gripping device of at least one of said carriages during the movement thereof in said first mentioned direction and for holding the gripping device of said carriages open during the entire movement thereof in said second mentioned direction.

15. A work feeding mechanism comprising two reciprocable carriages arranged one behind the other, separate cams mounted about a common axis and cooperating with the respective carriages for successively moving the same in one direction, fluid pressure cylinders operatively connected to the respective carriages for moving the same in the opposite direction, work gripping devices carried by the respective carriages in operative relation to the same workpiece, fluid pressure cylinders mounted on the respective carriages for opening and closing the work gripping devices carried thereby, and control means responsive to the movement of each carriage for closing the work gripping device thereof during the movement thereof in said first mentioned direction and for holding said device open during the movement of said carriage in said second mentioned direction, the work gripping mechanism of at least one of said carriages being closed during the movement thereof in said first mentioned direction.

16. A work feeding mechanism comprising two reciprocable carriages arranged one behind the other for movement in the same horizontal plane, cam rollers journaled on the respective carriages for rotation about vertical axes, axially spaced duplicate cams mounted for joint rotation about a common horizontal axis disposed longitudinally of the carriage movement and cooperating with the cam roller of the respective carriages for moving the same in one direction only, said cams being offset circumferentially, whereby one carriage lags behind the other during the movement of said carriages in said direction, fluid pressure cylinders operatively connected to the respective carriages for moving the same in the opposite direction, work gripping devices carried by the respective carriages in operative relation to the same workpiece, fluid pressure cylinders mounted on the respective carriages for opening and closing the work gripping devices carried thereby, and control means for said carriage and grip device operating cylinders responsive to the movement of each carriage for closing the work gripping device thereof during the movement thereof in said first mentioned direction and for holding said device open during the movement of said carriage in said second mentioned direction, and means for adjusting said control means to render the gripping device of one carriage inoperative and the work gripping device of the other carriage operative only during the movement thereof in said second mentioned direction.

17. A work feeding mechanism comprising two reciprocable carriages arranged one behind the other, separate cams mounted for joint rotation about a common axis and cooperating with the respective carriages for successively moving the same in one direction, fluid pressure cylinders operatively connected to the respective carriages for moving each carriage in the opposite direction while the other carriage is moving in the first mentioned direction, work gripping devices carried by the respective carriages in operative relation to the same workpiece, and fluid pressure cylinders mounted on the respective carriages for closing the work gripping devices carried thereby during the movement thereof in said first mentioned direction and for holding said device open during the movement of said carriages in said second mentioned direction, the operating cylinder for each of said carriages being adapted during the cam operated movement thereof to transmit pressure to the cylinder carried by said carriage to thereby close the work gripping device controlled thereby.

18. A work feeding mechanism comprising two reciprocable carriages arranged one behind the other, separate cams jointly rotatable about a common axis and cooperating with the respective carriages for successively moving the same in one direction, fluid pressure cylinders operatively connected to the respective carriages for moving each carriage in the opposite direction while the other carriage is moving in said first mentioned direction, work gripping devices carried by the respective carriages in operative relation to the same workpiece, fluid pressure cylinders mounted on the respective carriages closing the work gripping devices carried thereby for closing the work gripping device thereof during the movement thereof in said first mentioned direction and for holding said device open during the movement of said carriage in said second mentioned direction, and means for rotating said cams, said means comprising a shaft disposed parallel to the cam axis, means for driving said cams, two clutches mounted on said shaft, bevel pinions on the driven element of the respective clutches, a shaft disposed crosswise of said cam axis, a bevel gear fixed to said last mentioned shaft and intermeshing continuously at diametrically opposite points with said bevel pinions, a spur pinion on said cross shaft, a second crossshaft having a worm thereon and a spur gear intermeshing with said spur pinion, and a worm wheel rotatable with said cams and intermeshing with said worm.

19. A work feeding mechanism comprising two reciprocable carriages arranged one behind the other, a cam shaft disposed lengthwise of the carriage movement, separate members fixed to said shaft and having duplicate but circumferentially offset radial cam faces cooperating with the respective carriages for successively moving the same in one direction only, fluid pressure cylinders operatively connected to the respective carriages for moving the same in the opposite direction only, work gripping devices carried by the respective carriages in operative relation to the same workpiece, fluid pressure cylinders mounted on the respective carriages for closing the work gripping device thereof during the movement thereof in said first mentioned direction and for holding said device open during the movement of said carriage in said second mentioned direction, and means for rotating said cam shaft, said means comprising a clutch shaft disposed parallel to said cam shaft, means for driving said shaft, two clutches mounted on said shaft, bevel pinions on the driven elements of the respective clutches, a shaft disposed crosswise of said cam shaft, a bevel gear fixed to said cross shaft and intermeshing continuously at diametrically opposite points with the two bevel clutch shaft pinions, a spur pinion on said cross shaft, a worm shaft having a spur gear thereon intermeshing with said spur pinion, a worm on said wormshaft, and a worm wheel on said cam shaft intermeshing with said worm, work feed rollers, and a driving connection between said cam shaft and said feed rollers for driving the latter.

20. A work feeding mechanism comprising two reciprocable carriages arranged one behind the other, a cam shaft disposed lengthwise of the carriage movement, separate members fixed to said shaft and having duplicate but circumferentially offset radial cam faces cooperating with the respective carriages for successively moving the same in one direction only, fluid pressure cylinders operatively connected to the respective carriages for moving the same in the opposite direction only, work gripping devices carried by the respective carriages in operative relation to the same workpiece, fluid pressure cylinders mounted on the respective carriages for closing the work gripping device thereof during the movement thereof in said first mentioned direction and for holding said device open during the movement of said carriage in said second mentioned direction, and means for rotating said cam shaft, said means comprising a clutch shaft disposed parallel to said cam shaft, means for driving said shaft, two clutches mounted on said shaft, bevel pinions on the driven elements of the respective clutches, a shaft disposed crosswise of said cam shaft, a bevel gear fixed to said cross shaft and intermeshing continuously at diametrically opposite points with the two bevel clutch shaft pinions, a spur pinion on said cross shaft, a worm shaft having a spur gear thereon intermeshing with said spur pinion, a worm on said worm shaft, and a worm wheel on said cam shaft intermeshing with said worm, work feed rollers, and a driving connection between said cam shaft and said feed rollers for driving the latter, said driving connection comprising a shaft having a bevel pinion thereon, a sprocket wheel and chain connection between said cam shaft and said bevel pinion shaft, a shaft having a bevel gear thereon intermeshing with said bevel pinion, and a worm gearing connection between said last mentioned shaft and each of said feed rollers.

21. A work feeding mechanism comprising two reciprocable carriages, work gripping devices carried by the respective carriages in operative relation to the same workpiece, mechanically operated means for moving said carriages in one direction only, a hydraulic circuit including fluid pressure cylinders for moving said carriages in the opposite direction, fluid pressure cylinders mounted on the respective carriages for opening and closing the work gripping devices carried thereby, and a separate control valve for each carriage operating and grip actuating cylinder operable by the movement of said carriages for actuating said carriage operating and grip actuating cylinders at predetermined points in the cycle of operation of said carriage.

22. A work feeding mechanism comprising two reciprocable carriages, mechanically operated means for moving said carriages in one direction, work gripping devices carried by the respective carriages in operative relation to the same workpiece, a hydraulic circuit including a pump, fluid pressure cylinders for moving said carriages in the opposite direction, fluid pressure cylinders mounted on and movable with the respective carriages for opening and closing the work gripping devices carried thereby, and control valves for the cylinders associated with the respective carriages, and an electric control circuit for said hydraulic circuit including solenoids for operating the respective valves, switches for operating the respective solenoids, and means on the respective carriages for operating said switches, whereby said carriage operating cylinders are operated to move said carriages in said second mentioned direction at the end of the mechanical movement of said carriages in said first mentioned direction, and said grip operating cylinders are operated to close the work gripping devices of each carriage during the movement thereof in said first mentioned direction and to hold said device open during the movement of each carriage in said second mentioned direction.

WALTER SIEGERIST.